(12) United States Patent
Walz

(10) Patent No.: US 7,305,953 B2
(45) Date of Patent: Dec. 11, 2007

(54) BUILT MULTIPLE CAM

(75) Inventor: Thomas Walz, Satteins (AT)

(73) Assignee: Thyssenkrupp Automotive AG, Bochum (DE)

( * ) Notice: Subject to any disclaimer, the term of this patent is extended or adjusted under 35 U.S.C. 154(b) by 0 days.

(21) Appl. No.: 10/580,376

(22) PCT Filed: Feb. 10, 2005

(86) PCT No.: PCT/EP2005/001327

§ 371 (c)(1),
(2), (4) Date: Jul. 20, 2006

(87) PCT Pub. No.: WO2005/090756

PCT Pub. Date: Sep. 29, 2005

(65) Prior Publication Data

US 2007/0074685 A1    Apr. 5, 2007

(30) Foreign Application Priority Data

Feb. 23, 2004   (DE) ................... 10 2004 009 074

(51) Int. Cl.
*F01L 1/04* (2006.01)
(52) U.S. Cl. ............... 123/90.6; 123/90.27; 29/888.1
(58) Field of Classification Search ........... 123/90.6, 123/90.16, 90.2, 90.27, 90.31, 90.39, 90.44; 29/888.1
See application file for complete search history.

(56) References Cited

U.S. PATENT DOCUMENTS

| | | | |
|---|---|---|---|
| 3,882,832 A | 5/1975 | Ohsaki et al. | |
| 5,558,507 A | 9/1996 | Magnus | |
| 5,979,386 A | 11/1999 | Swars | |
| 6,182,627 B1 | 2/2001 | Matthews | |
| 6,192,582 B1 * | 2/2001 | Swars | 29/888.1 |
| 6,725,818 B2 | 4/2004 | Methley | |
| 2002/0020371 A1 | 2/2002 | Jessel | |

FOREIGN PATENT DOCUMENTS

| | | |
|---|---|---|
| DE | 36 38 310 | 5/1988 |
| DE | 196 06 732 | 9/1996 |
| DE | 197 55 113 | 7/1998 |
| EP | 1 057 979 | 12/2000 |
| EP | 1 362 986 | 11/2003 |
| WO | WO- 98/26161 | 6/1998 |
| WO | WO- 02/16741 | 2/2002 |

* cited by examiner

*Primary Examiner*—Ching Chang

(57) ABSTRACT

A built multiple cam is disclosed which can be produced at low cost and which can be used in a flexible manner and which requires a small amount of construction space in an axial direction. The built multiple cam comprises the following components: a first partial cam provided with a bore, a cam contour A and a joint contour which is arranged in axial proximity thereto and provided with an outer surface; a second partial cam provided with a bore, a cam contour A and a joint contour which is arranged in axial proximity thereto and provided with an outer surface; a ring which is provided with a cam contour B which is different from cam contour A and an inner contour having an inner surface, wherein the inner surface of the ring can be displaced towards the outer surfaces of the partial cams; and connections which act between the ring and the partial cam ensure a fixed connection between such components. Also disclosed is a method used to produce a built camshaft comprising at least one built multiple cam.

23 Claims, 2 Drawing Sheets

BUILT MULTIPLE CAM

BACKGROUND OF THE INVENTION

The invention relates to a built-up multiple cam, a camshaft having at least one built-up multiple cam and to a method of producing a camshaft having at least one built-up multiple cam.

The further development in the field of valve-controlled internal combustion engines places ever greater demands upon the camshafts utilised for controlling the valves. An important trend resides in the use of techniques for the variable control of the valve control times. Most recently, systems have become established, in which the valve lift is controlled by two mutually different cam contours, so that it is possible to switch between two different valve lifts. For this purpose, camshafts are used having multiple cams, on which at least two different cam contours are formed. The "VarioCam Plus" system which is utilised in vehicles produced by the company Porsche can be described as an example of this type of system. In the case of this system, so-called switchable bucket tappets are used, the mode of operation of which is known to the person skilled in the relevant technical field.

In order to improve the manner in which the forces are distributed in the force flow between the cam and the cam follower (e.g. a switchable bucket tappet), the cam is typically divided into three parts, wherein between two identical, axially mutually spaced apart outer cams having an identical cam contour there is disposed an inner second cam having a second cam contour which is different from the cam contour of the outer cams. It is known from the prior art that multiple cams of this type can be formed e.g. by milling in one piece or by grouping together three separate cams.

DE 196 06 732 C2 discloses multiple cams which consist of several individual parts which are assembled in the axial direction. The individual parts are formed by tube portions, of which portions are non-circular and which comprise concentric annular projections on the mutually facing ends. These projections are assembled together in order to form a multiple cam from the individual parts. These concentric annular projections are formed having a circular cross-section and are approximately half the wall thickness of the tube portion. This ensures that after the individual parts have been assembled together the complete wall thickness of the tube portions is provided even in the region of the assembled projections.

The multiple cams which are known from DE 196 06 732 C2 have the disadvantage that the connection between the individual parts is comparatively weak in the region of the concentric annular portions. In particular, the connection between the individual parts is not sufficiently torsion-resistant. In addition, the multiple cams which are disclosed in DE 196 06 732 C2 are only suitable for those camshafts which are produced according to the process of hydroforming.

SUMMARY OF THE INVENTION

It is the object of the invention to provide a built-up multiple cam which can be produced cost-effectively and can be used in a flexible manner and which requires a small amount of installation space in the axial direction. In particular, it is intended to be joined to the support shaft of the camshaft with the aid of simple joining processes and also to be useable for built-up camshafts which are not produced according to the process of hydroforming. It is also the object of the invention to provide a camshaft which can be produced cost-effectively and is suitable for use in valve transmissions having different cam followers, such as switchable bucket tappets, roller followers or the like. Finally, it is the object of the invention to provide a method which can be used to produce built-up camshafts of this type.

The multiple cam in accordance with the invention is composed of three individual parts, namely two partial cams and a ring which connects these partial cams together.

Each of these individual parts can be mass-produced in a cost-effective manner. Both the partial cams and also the ring comprise cam contours on their outer sides. By virtue of the fact that the ring is slid on to the outer surfaces of the joint contours of the partial cams, the connection means which are required to establish the firm connection between these three components are disposed radially underneath the ring and do not take up any additional axial installation space. This arrangement serves to produce a multiple cam which takes up a small amount of installation space in the axial direction.

The individual parts of the multiple cam can be produced independently of each other in a completely different manner. Thus, the partial cams can be produced e.g. both by sintering technology and also by cold or hot forming (forging). It is also feasible to produce the partial cams by means of metal-removing manufacturing processes (milling, lathing). Therefore, the manufacturing process and the material for the partial cams can be selected in dependence upon the loads upon the cams during engine operation. The ring be produced either as a steel ring, e.g. as a portion of a drawn tube, as a hot or cold formed part or even as a sintered part. It is also possible to produce the ring directly from solid metal by means of metal-removing manufacturing processes. For the ring, the selection of the manufacturing process and the material can also be tailored to suit the levels of strength required during engine operation.

The partial cams and the ring can each be hardened separately and tempered as required. In so doing, all hardening and quenching and tempering processes can be utilised and freely combined, since the three individual parts which form the multiple cam do not have to be treated together. For example, it is possible to harden the partial cams inductively and to nitrate the ring in plasma or to harden it as bulk material.

In the case of the multiple cam in accordance with the invention, the ring comprises a non-circular inner contour. Accordingly, the joint contours of the partial cams are also formed in the same manner so as to be non-circular, in order to allow the ring to be slid on. In this manner, a form-fit which is effective in the peripheral direction is achieved between the ring and the partial cams. This form-fit ensures that after the individual parts have been assembled together the multiple cam is preassembled so as to be torsion-resistant in the peripheral direction.

The connection means which are effective between the ring and the partial cams are formed in an advantageous manner as an interference fit. For example, in order to produce this type of interference fit, the joint contours of the partial cams and the inner contour of the ring are dimensioned in terms of their manufacturing tolerances in a known manner such that the surfaces which are slid one on top of the other form an interference fit. In this manner, the amount of work required for the preassembly of the multiple cam is kept low since, apart from sliding the ring on to the joint contours of the partial cams, no further separate working steps are required in order to establish the desired firm connection between the components.

After assembly of the camshaft is completed, the finished contour of the cams is produced by grinding. In order also to be able to grind the cam contour of the ring in a problem-free manner, it is advantageous for the cam contour of the ring to be axially spaced apart from the cam contour of the partial cams. This axial spacing is also defined as clearance. In order to achieve this clearance in a convenient manner, at least one partial cam comprises, in the region of the transition from the joint contour to the cam contour, a shoulder which protrudes in the radial direction beyond the outer surface of the partial cam. When the ring is slid on to the joint contour, this shoulder functions as a spacer which provides the desired axial spacing between the cam contour of the ring and the cam contours of the partial cams. By dimensioning the axial extension of the shoulder, it is possible to adjust the dimension of this spacing in accordance with the requirements of the individual case. The shoulder can be an integral component of the partial cam (e.g. a radius or a sintered chamfer) or can be formed by means of a separate component such as e.g. a ring element which is adapted to the joint contour of the partial cam. The clearance can also be an integral component of the middle ring.

In order to keep manufacturing costs and the outlay low for the production of the partial cams, it is desirable not to have to subsequently machine mechanically (e.g. by grinding) the end faces of the partial cams which face one another when the multiple cam is in the assembled state. Subsequent mechanical machining of this type can be prevented if the said end faces of the partial cams do not contact one another in the assembled state, i.e. if a gap remains between them. A gap of this type is achieved in a convenient manner by virtue of the fact that the ring comprises an axial extension which is larger than the sum of the axial extensions of the joint contours of the partial cams. In this manner, the ring keeps the said end faces of the partial cams at a spaced interval with respect to each other.

In order to achieve a particularly effective level of strength in the connection established between the ring and the partial cams and to facilitate the joining operation between the ring and the partial cams, the outer surfaces of the joint contours of the partial cams and/or the inner surface of the inner contour of the ring are advantageously provided with engraving. This engraving can be applied e.g. by roller-burnishing or knurling. Therefore, when the ring is slid on to the joint contours of the partial cams, a force-fit and/or form-fit of the ring on the joint contours of the partial cams is produced in a manner known to the person skilled in the art, which results in a particularly firm mutual connection of the components. It is also advantageous that these engravings render it possible to lower considerably the tolerance requirements to be placed upon the individual components of the multiple cam (partial cams and ring). If the partial cams are produced in the sintering process, this engraving can be formed directly during sintering as a serrated, axially extending toothing arrangement having tooth peaks which point radially outwards. In this case, the ring can additionally comprise engraving which has been produced e.g. by knurling or by roller-burnishing. It is also possible to produce the partial cams as sintered parts without any engraving and to provide the engraving only on the ring.

In order to make it easier to slide the ring on to the joint contours of the partial cams, the inner contour of the ring advantageously comprises a radial widened portion on its axial end regions. In a similar manner, the procedure of threading the preassembled multiple cam or the partial cams on to the support shaft is facilitated if the bore of the partial cams comprises an inner contour which is widened in a funnel-like manner with respect to the bore in the region of the particular end faces, which are first slid over the support shaft, or on the end which is slid on to the support shaft.

A camshaft which supports one or several multiple cams in accordance with the invention can be produced cost-effectively owing to the ability to produce the multiple cams themselves in a cost-effective manner. Owing to the small axial installation space requirement of the multiple cams, the said camshaft is suitable in particular for the actuation of switchable bucket tappets, in which it is known to be of importance to accommodate two cams with different cam contours in an axially very limited space, in order to achieve valve strokes of different magnitudes. However, the use of a camshaft in accordance with the invention is not restricted to the application of "switchable bucket tappets". It can also be used in a flexible and advantageous manner for the actuation of other cam followers such as e.g. roller followers.

In the case of the invention, it is advantageous that the multiple cam can be preassembled without the aid of further components merely by pushing together the three components "first partial cam", "ring" and "second partial cam". The components of the preassembled multiple cam are firmly connected to each other in such a manner that the multiple cam can be handled safely for further assembly of the camshaft.

With this type of multiple cam, the camshaft can be assembled in a convenient manner by virtue of the fact that the preassembled multiple cam is slid on to a support shaft up to a predetermined portion of the support shaft and during the sliding on procedure or following on from this, the multiple cam is fixed in an axial and torsion-resistant manner on this predetermined portion of the support shaft. The said multiple cam can be fixed in different ways. For example, the attachment of the multiple cam to the support shaft can be fixedly welded by means of a beam welding process, e.g. laser or electron beam welding. Alternatively, the attachment can be achieved in a manner which is known per se by means of a force-fit and/or form-fit. For this purpose, the multiple cam can be slid either over a support shaft portion which has been previously widened by roller-burnishing or knurling or the support shaft is widened by hydroforming in the region of the multiple cam after positioning thereof. Whereas the widening procedure as performed by roller-burnishing or by knurling can be used both on hollow and also solid support shafts, the widening procedure as performed by hydroforming can only be used on hollow support shafts. Finally, it is also possible by grinding or rolling to introduce diameter differences into the support shaft and to fix the multiple cam at the axial positions with a larger diameter.

A production method alternative to the production method described above includes providing a support shaft which comprises at least one portion which is surface-finished by roller-burnishing or by knurling such that it comprises an increased outer diameter in comparison with the portions of the support shaft which are not machined. The first partial cam is slid on to this support shaft, then the ring and then the second partial cam are slid on to a portion of the support shaft whose outer diameter has not been increased by roller-burnishing or by knurling and which adjoins the portion with the increased outer diameter. The sliding-on procedure is performed in such a manner that the joint contours of the partial cams face towards the ring and the desired angular position of the partial cams and of the ring with respect to the support shaft is adjusted. Subsequently, the first partial cam, the ring and the second partial cam are pressed on by jointly sliding these components on to the roller-burnished or knurled portion of the support shaft, wherein the ring slides with its inner surface over the outer surfaces of the partial cams, so that the multiple cam is formed and is fixed with a force-fit and/or form-fit in an axial and torsion-resistant manner at the designated position, i.e. on the designated portion of the support shaft.

The advantage of the above-described procedure of sliding on the partial cams and the ring together resides in the fact that only one working operation is required to form the multiple cam and to fix it at the same time at the designated point on the support shaft. However, it is naturally also possible to slide the individual components individually and one after the other over the roller-burnished or knurled portion of the support shaft.

In a further embodiment, multiple cams having more than 3 cam contours are also formed in the manner described above. Then, the partial cams each comprise a cam contour for the actuation of a cam follower and comprise two joint contours axially offset thereto. Therefore, a multiple cam is formed consisting of several rings and several partial cams. Partial cams which have only one joint contour form the axial termination of the multiple cam in each case.

Furthermore, it is also possible to form the joint contours on the partial cams and the inner contours on the rings substantially in a circular manner. In so doing, the joint contours can be formed concentrically with respect to the support shaft.

The invention will be explained in detail hereinunder with reference to the drawings.

DESCRIPTION OF THE PREFERRED EMBODIMENTS

Figure 1:
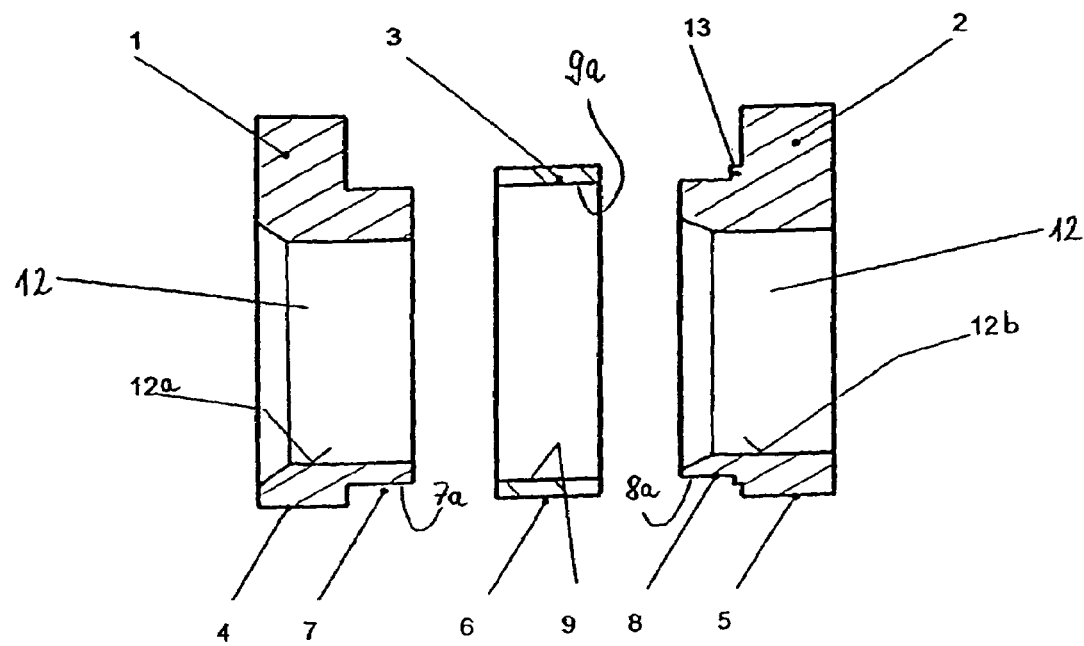
FIG. 1 shows an axial sectional view of the individual parts of a multiple cam in accordance with the invention.

FIG. 1 illustrates a partial cam 1 which comprises a bore 12, an outer cam contour 4 and a joint contour 7. In a similar manner, the partial cam 2 comprises a bore 12, a cam contour 5 and a joint contour 8. In addition, the partial cam 2 is provided with a shoulder 13 which is integrally formed with the partial cam 2. The bores 12 of the partial cams 1 and 2 are identical in size. The ring 3 comprises an outer cam contour 6 and an inner contour 9 which comprises an inner surface 9a. If the individual parts illustrated in FIG. 1 are to be assembled to form a multiple cam, then the ring 3 is slid with its inner surface 9a over the outer surfaces 7a, 8a of the joint contours 7, 8. During assembly, an interference fit is formed between the inner surface 9a and the outer surfaces 7a, 8a of the joint contours 7, 8. In order to achieve a particularly strong interference fit, the outer surfaces 7a, 8a of the joint contours 7, 8 and/or the inner surface 9a of the ring 3 are provided with engravings which have been applied e.g. by roller-burnishing or by knurling.

Figure 2:
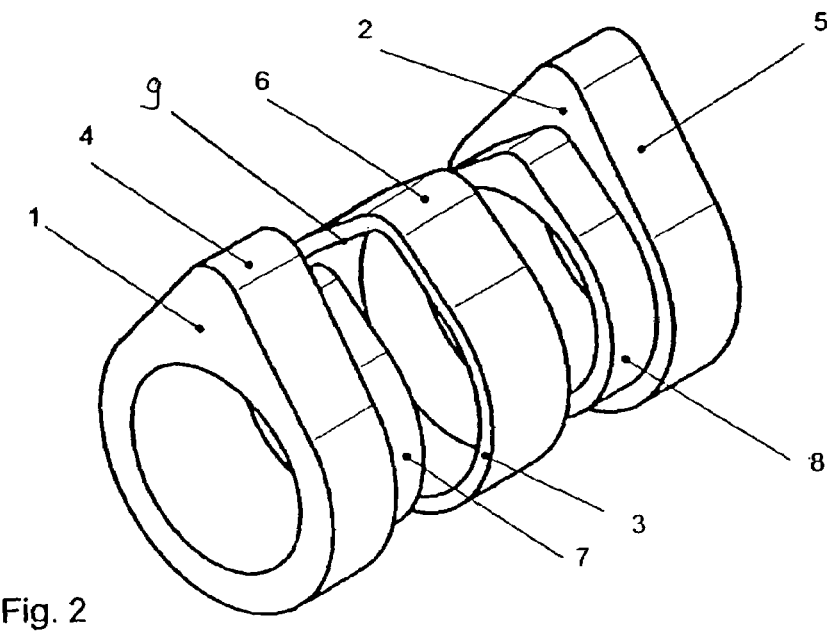
FIG. 2 shows a perspective illustration of the individual parts of a multiple cam in accordance with the invention.

It is clearly evident in FIG. 2 that the joint contours 7, 8 of the partial cams 1, 2 are formed to be non-circular in the same manner as the inner contour 9 of the ring 3. This ensures that the inner contour 9 of the ring 3 forms a form-fit with the joint contours 7, 8 of the partial cams 1, 2. This guarantees that the components are positioned in a torsion-resistant manner with respect to each other in the peripheral direction.

Figure 3:
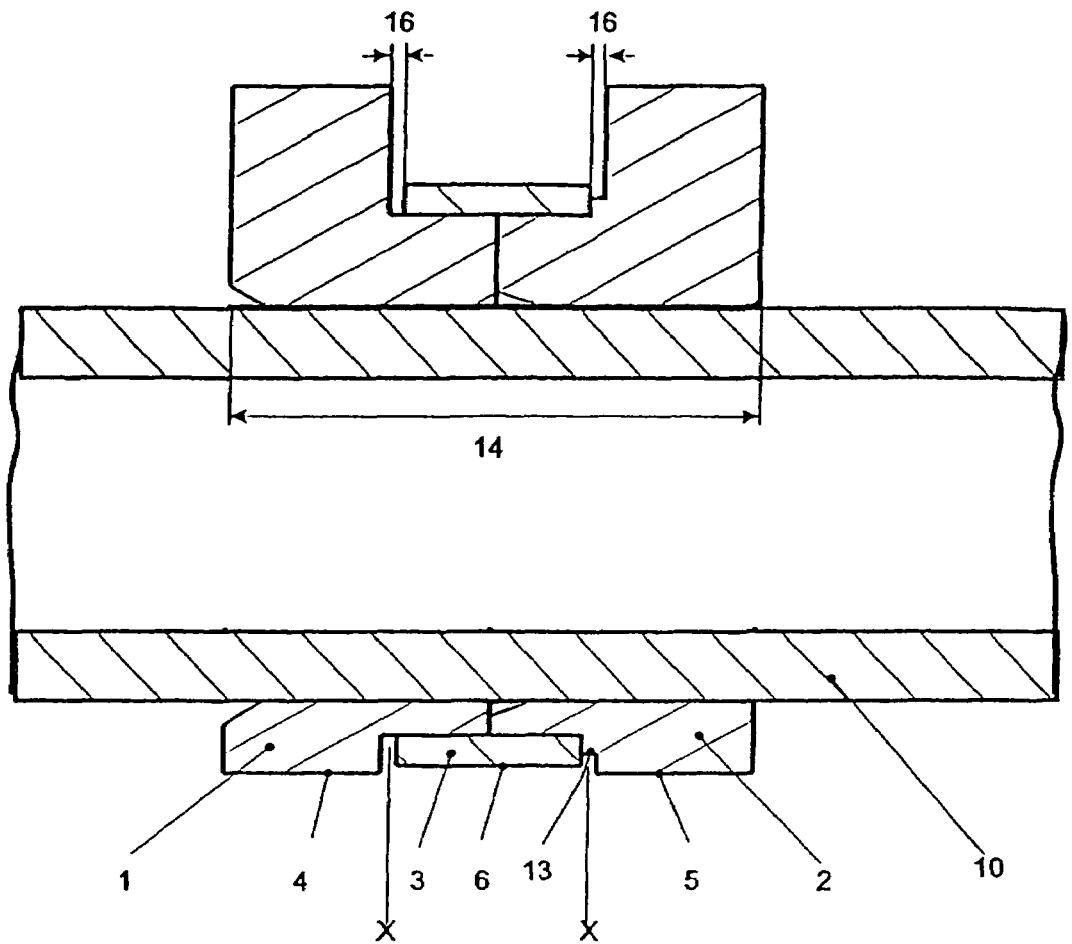
FIG. 3 shows an axial sectional view of an assembled multiple cam which is slid on to a predetermined portion of a support shaft.

The support shaft 10 which is illustrated in an axial sectional view in FIG. 3 comprises a portion 14 which has been surface-treated by roller-burnishing or by knurling before the preassembled multiple cam is slid on, so that this portion 14 is provided with an outer diameter which is larger than the remaining diameter of the support shaft 10. In order to arrange the multiple cam in an axial and torsion-resistant manner on the portion 14 of the support shaft 10, the multiple cam has been preassembled initially independently of the support shaft 10. For this purpose, the ring 3 has been initially slid on to the partial cam 2. Subsequently, the ring 3 has been slid on to the corresponding joint contour 7 of the partial cam 1, so that the preassembled multiple cam is formed. This multiple cam has then been slid on to a region of the support shaft 10, which is not roller-burnished or knurled, and has been slid along towards the roller-burnished or knurled portion 14. In so doing, the inner surfaces of the bores 12 of the partial cams 1, 2 can comprise a toothing arrangement, the tooth peaks of which extend in the axial direction. It is favourable if the tooth depth amounts to approximately 0.01 mm to 0.1 mm. Furthermore, the bore 12 comprises, at least on the end with which it is slid on to the support shaft 10, a funnel-like widened portion which makes it easier to thread the relevant partial cam on to the support shaft 10. In conformity with the widened portion of the support shaft as achieved by roller-burnishing, suitable values for this widened diameter portion of the bore 12 range from 0.05 mm to 0.33 mm. If the aforesaid dimensions for the tooth depth or for the widened diameter portion are observed, this serves to produce a form-fit and a force-fit. The funnel-like widened portion can also be formed on each partial cam.

After the preassembled multiple cam has been slid along towards the portion 14 which is prepared in the manner described above, the multiple cam can be slid on to the portion 14. In this case, a form-fitting and/or force-fitting connection is formed between the support shaft 10 and the partial cams 1, 2 of the multiple cam. It should be noted that the multiple cam in accordance with the invention comprises a comparatively long joint length, thus increasing the strength of the connection and reducing the loading upon the partial cams 1, 2 during the joining process.

As an alternative to the above-described manner of fixing the multiple cam on the portion 14 of the support shaft 10, the multiple cam can be fixed by beam welding. In this case, in the arrangement as illustrated in FIG. 3 the welding beam is advantageously guided along the gap 16. The welding connection is thus produced in a region of the multiple cam which is not in contact with the cam follower, not illustrated. In FIG. 3, the welding beams are indicated by the lines designated by the letter X. If the multiple cam is fixed on the support shaft 10 by means of beam welding, it is not significant as to whether the shoulder 13 is formed only on one or both partial cams 1, 2. It is equally not significant as to whether the shoulder 13, as illustrated in FIG. 3, is formed in one piece with the partial cam 2 or whether it is formed as a separate component.

Figure 4:
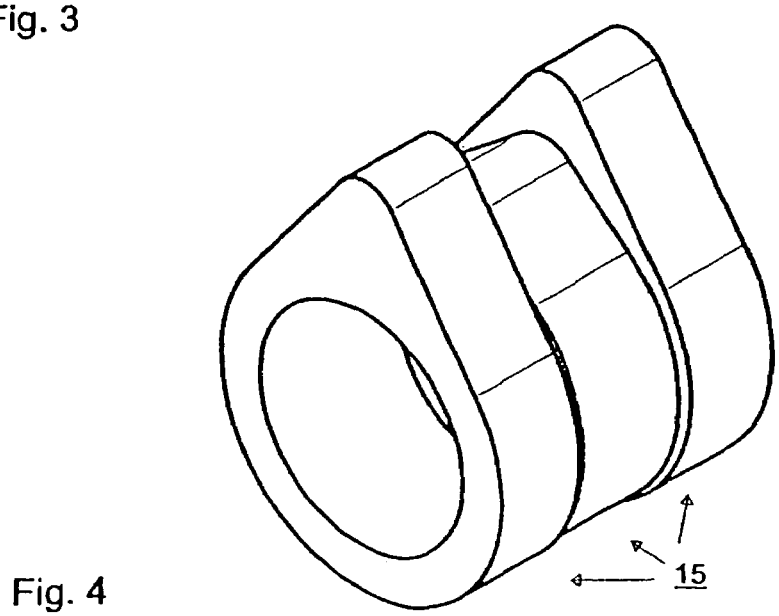
FIG. 4 shows a perspective view of a preassembled multiple cam in accordance with the invention.

FIG. 4 illustrates a perspective view of a preassembled multiple cam 15. This preassembled multiple cam 15 is obtained in the manner described above, namely by joining together the individual parts (partial cam 1, ring 3, partial cam 2) as illustrated in FIG. 1 and 2 by sliding 3 on to the joint contours 7, 8.

LIST OF REFERENCE NUMERALS 1. partial cam
2. partial cam
3. ring
4. cam contour
5. cam contour
6. cam contour
7. joint contour
7a. outer surface
8. joint contour
8a. outer surface
9. inner contour
9a. inner surface
10. support shaft
12. bore
12a. inner contour
12b. inner contour
13. shoulder
14. portion
15. multiple cam
16. gap
X welding beam

The invention claimed is:

1. A built-up multiple cam for a camshaft, comprising:
    a first partial cam having a bore, a cam contour A and a joint contour which is disposed axially adjacent thereto and comprises an outer surface,
    a second partial cam having a bore a cam contour A and a joint contour which is disposed axially adjacent thereto and comprises an outer surface,
    a ring having a cam contour B which is different from the cam contour A, and an inner contour which comprises an inner surface, wherein the ring can be slid with its inner surface on to the outer surfaces of the partial cams, and
    connection means which are effective between the ring and the partial cams and ensure a firm connection between these components.

2. The built-up multiple cam as claimed in claim 1, wherein the inner contour of the ring and the joint contours of the partial cams are non-circular.

3. The built-up multiple cam as claimed in claim 1, wherein the connection means which are effective between the ring and the partial cams are formed as an interference fit.

4. The built-up multiple cam as claimed in claim 1, wherein at least one of the two partial cams in the region of the transition from the joint contour to the cam contour there is disposed a shoulder which protrudes in a radial direction beyond the outer surface of the partial cam.

5. The built-up multiple cam as claimed in claim 4, wherein the shoulder is formed in one piece with the partial cam as a radius.

6. The built-up multiple cam as claimed in claim 4, wherein the shoulder is formed in one piece with the partial cam as a chamfer.

7. The built-up multiple cam as claimed in claim 1, wherein the axial extension of the ring is greater than the sum of the axial extensions of the joint contours.

8. The built-up multiple cam as claimed in claim 1, wherein the outer surfaces are provided with engraving.

9. The built-up multiple cam as claimed in claim 1, wherein the inner ring surface comprises engraving or an axially extending toothing arrangement.

10. The built-up multiple cam as claimed in claim 1, wherein the inner contour of the ring comprises a radial widened portion on its axial end regions.

11. The built-up multiple cam as claimed in claim 1, wherein in at least one end region of at least one of the partial cams, the bore comprises an inner contour which is widened in a funnel-like manner with respect to the bore.

12. The built-up camshaft having at least one multiple cam as claimed in claim 1.

13. A method of producing built-up camshafts having at least one multiple cam as claimed in claim 1, comprising the steps of:
    assembling the multiple cam as a preassembly;
    sliding the preassembled multiple cam on to a support shaft up to a predetermined portion of the support shaft; and
    fixing the multiple cam in an axial and torsion-resistant manner on this predetermined portion of the support roller.

14. A method of producing built-up camshafts as claimed in claim 13, wherein in order to attach at least one of the partial cams a welding beam, is guided through the partial cam radially at the axial position, at which the ring is spaced apart with a gap from the partial cam which is to be welded, and therefore the partial cam is welded to at least certain points of the support shaft.

15. A method according to claim 14, wherein the welding beam is a laser.

16. A method according to claim 14, wherein the welding beam is an electron beam.

17. A method of producing built-up cam shafts having at least one multiple cam as claimed in claim 1, comprising the steps of:
    providing a support shaft which comprises at least one portion which has been surface-finished by roller-burnishing or by knurling such that it comprises a larger outer diameter than the portions of the support shaft which have not been machined,
    sliding the first partial cam the ring and the second partial cam on to a portion of the support shaft whose outer diameter has not been increased by roller-burnishing or by knurling and which adjoins the surface-finished portion, wherein the sliding-on procedure is performed in such a manner that the joint contours of the partial cams face towards the ring and the desired angular position of the partial cams and of the ring with respect to the support shaft is adjusted, and
    pressing-on the first partial cam, the ring and the second partial cam by sliding these components together on to the surface-finished portion of the support shaft, wherein the ring slides with its inner surface over the outer surfaces of the partial cams, so that the multiple cam is formed and is fixed with a force-fit and/or form-fit in an axial and torsion-resistant manner at the designated position.

18. A method of producing built-up cam shafts which comprises a support shaft having at least one multiple cam as claimed in claim 1, having at least three cam contours which are disposed axially adjacent to each other, wherein, in each case alternately until the required number of cam contours is achieved:

initially a first partial cam comprising a cam contour, followed by a ring comprising a cam contour, and then a further partial cam comprising a cam contour are slid over the support shaft and are then attached to the support shaft in an axial and torsion-resistant manner at the predetermined axial location with predetermined radial angles in order to form the multiple cam.

19. A method according to claim 18, wherein the support shaft is a tube.

20. A method according to claim 18, wherein the support shaft is a bar.

21. The built-up multiple cam as claimed in claim 1, wherein the connection means which are effective between the ring and the partial cams are formed as a form-fit.

22. The built-up multiple cam as claimed in claim 1, wherein the outer surfaces are provided with engraving which has been applied by roller-burnishing.

23. The built-up multiple cam as claimed in claim 1, wherein the outer surfaces are provided with engraving which has been applied by knurling.

* * * * *